US012617949B2

(12) United States Patent
Nakamura

(10) Patent No.: US 12,617,949 B2
(45) Date of Patent: May 5, 2026

(54) SILICA, PAINT AND SILICA MANUFACTURING METHOD

(71) Applicant: TOKUYAMA CORPORATION, Shunan (JP)

(72) Inventor: Masahiro Nakamura, Shunan (JP)

(73) Assignee: TOKUYAMA CORPORATION (JP)

( * ) Notice: Subject to any disclaimer, the term of this patent is extended or adjusted under 35 U.S.C. 154(b) by 826 days.

(21) Appl. No.: 17/799,020

(22) PCT Filed: Apr. 1, 2021

(86) PCT No.: PCT/JP2021/014165
§ 371 (c)(1),
(2) Date: Aug. 11, 2022

(87) PCT Pub. No.: WO2021/201229
PCT Pub. Date: Oct. 7, 2021

(65) Prior Publication Data
US 2023/0074494 A1 Mar. 9, 2023

(30) Foreign Application Priority Data

Apr. 2, 2020 (JP) ................................. 2020-066586

(51) Int. Cl.
| | |
|---|---|
| *C09D 7/42* | (2018.01) |
| *C01B 33/18* | (2006.01) |
| *C08K 3/36* | (2006.01) |
| *C09C 1/30* | (2006.01) |
| *C09D 7/40* | (2018.01) |
| *C09D 7/61* | (2018.01) |

(52) U.S. Cl.
CPC ................ *C09D 7/42* (2018.01); *C01B 33/18* (2013.01); *C09C 1/3018* (2013.01); *C09C 1/3027* (2013.01); *C09D 7/61* (2018.01); *C09D 7/69* (2018.01); *C01P 2002/84* (2013.01); *C01P 2004/50* (2013.01); *C01P 2004/61* (2013.01); *C01P 2006/10* (2013.01); *C01P 2006/11* (2013.01); *C08K 3/36* (2013.01); *C08K 2201/005* (2013.01)

(58) Field of Classification Search
CPC ... C09D 7/42; C09D 7/61; C09D 7/69; C09D 201/00; C01B 33/18; C01B 33/14; C09C 1/3018; C09C 1/3027; C09C 1/30; C01P 2002/84; C01P 2004/50; C01P 2004/61; C01P 2006/10; C01P 2006/11; C01P 2004/51; C01P 2006/12; C01P 2006/19; C01P 2006/22; C01P 2006/62; C08K 3/36; C08K 2201/005
See application file for complete search history.

(56) References Cited

U.S. PATENT DOCUMENTS

| | | | |
|---|---|---|---|
| 4,150,101 | A | 4/1979 | Schmidt et al. |
| 7,285,330 | B2 | 10/2007 | Meyer et al. |
| 2004/0047792 | A1 | 3/2004 | Schubert et al. |
| 2004/0121156 | A1 | 6/2004 | Meyer et al. |
| 2005/0065268 | A1 | 3/2005 | Morea-Swift et al. |
| 2006/0100344 | A1 | 5/2006 | Stenzel et al. |
| 2012/0202914 | A1 | 8/2012 | Benner et al. |
| 2017/0342232 | A1 | 11/2017 | Haruta et al. |
| 2019/0008134 | A1 | 1/2019 | Miyamoto et al. |

FOREIGN PATENT DOCUMENTS

| | | | | |
|---|---|---|---|---|
| CN | 101481115 A | | 7/2009 | |
| CN | 102031035 A | | 4/2011 | |
| CN | 106634149 A | * | 5/2017 | ........... C01B 33/183 |
| JP | S56-44012 B2 | | 10/1981 | |
| JP | 2004-099435 A | | 4/2004 | |
| JP | 2005-126281 A | | 5/2005 | |
| JP | 4440114 B2 | | 3/2010 | |
| JP | 2015-113276 A | | 6/2015 | |
| JP | 2017020041 A | * | 1/2017 | |
| JP | 2017-025275 A | | 2/2017 | |
| WO | 2017-026388 A1 | | 2/2017 | |

OTHER PUBLICATIONS

Naoki, JP2017020041-MT (Year: 2017).*
Fang, CN106634149-MT (Year: 2017).*
International Search Report (English and Japanese) issued in PCT/JP2021/014165, mailed Jun. 8, 2021; ISA/JP (5 pages).

* cited by examiner

*Primary Examiner* — Mark Eashoo
*Assistant Examiner* — Zhen Liu
(74) *Attorney, Agent, or Firm* — Harness, Dickey & Pierce, P.L.C.

(57) ABSTRACT

Provided is a silica that exhibits a high matting property when utilized as a matting agent for a paint, and can also suppress the occurrence of cloudiness. The silica has an aggregated structure in which primary particles are aggregated, has a particle diameter ratio R represented by the following equation (1) of from 4.3 to 5.2, has an absorbance of 0.6 or less for light having a wavelength of 700 nm as an aqueous dispersion having a concentration of 1.48 mass %, and has a particle density measured with a He pycnometer of 2.18 g/cm³ or more: Equation (1) $R = {}^L D50/{}^C D50$ (in the equation (1), ${}^L D50$ represents a volume-based 50% cumulative particle diameter ($\mu m$) of the silica measured based on a laser diffraction/scattering method, and ${}^C D50$ represents a volume-based 50% cumulative particle diameter ($\mu m$) of the silica measured based on a Coulter counter method).

7 Claims, No Drawings

SILICA, PAINT AND SILICA MANUFACTURING METHOD

CROSS REFERENCE TO RELATED APPLICATIONS

This application is a U.S. National Phase Application under 35 U.S.C. 371 of International Application No. PCT/JP2021/014165, filed on Apr. 1, 2021, which claims priority to Japanese Patent Application No. 2020-066586, filed on Apr. 2, 2020. The entire disclosures of the above applications are expressly incorporated by reference herein.

BACKGROUND

Technical Field

The present invention relates to a silica, a paint, and a method of producing a silica.

Related Art

Silica produced through flame thermal decomposition of a chlorosilane is fine silica having a specific surface area of from about 50 m²/g to about 500 m²/g, and is generally called fumed silica. The fumed silica is mainly used as a filling/reinforcing material or thickener for a transparent resin, and as a fluidizing agent for powder, and is excellent in dispersibility. Accordingly, the fumed silica is often utilized particularly as a filler for a silicone rubber, a thickener for a polyester resin, a fluidizing agent for toner, or the like.

However, when the fumed silica is applied as a matting agent for a paint, the above-mentioned good dispersibility is a disadvantage. That is, the fumed silica is dispersed in a paint to a size equal to or smaller than the wavelength of visible light even by a weak dispersion force. Consequently, in general, the fumed silica cannot be used as it is as a matting agent for a paint. Accordingly, silica obtained by milling and classifying wet process silica (silica produced in a solvent such as water) having a large particle diameter has only been used as a matting agent for a paint. However, even when the silica produced using the wet process silica as a raw material is used as a matting agent, it can hardly be said that sufficient matting performance is necessarily obtained.

Meanwhile, there is a proposal of a technology involving utilizing the fumed silica, which cannot be utilized as it is as a matting agent, as a matting agent. For example, in JP 56-44012 B2, there is a proposal of a technology involving utilizing, as a matting agent, a silicic acid having an aerogel-like structure, which is obtained by blending fumed silica with 5 wt % to 50 wt % of water and drying the resultant powdery mixture. In addition, there is also a proposal of a technology adopting an approach significantly different from that of the technology described in JP 56-44012 B2. For example, in JP 4440114 B2, there is a proposal of a technology involving utilizing, as a matting agent, texture-coated silica, which is obtained by spraying fumed silica with water and a thermoplastic elastomer, while mixing in a mixing vessel, and then milling and subsequently drying the mixture.

The inventor of the present invention has made further investigations on the technology described in JP 56-44012 B2 out of the technologies described in JP 56-44012 B2 and JP 4440114 B2, which adopt technical approaches significantly different from each other. As a result, the inventor has recognized that, even when the silica obtained utilizing the technology described in JP 56-44012 B2 is utilized as a matting agent for a paint, a sufficient matting property is not necessarily obtained.

The present invention has been made in view of the above-mentioned circumstances, and an object of the present invention is to provide a silica that exhibits a high matting property when utilized as a matting agent for a paint, and can also suppress the occurrence of cloudiness, a paint using the silica, and a method of producing the silica.

SUMMARY

The above-mentioned object is achieved by embodiments of the present invention to be described below.

According to one embodiment of the present invention, there is provided a silica, which has an aggregated structure in which primary particles are aggregated, has a particle diameter ratio R represented by the following equation (1) of from 4.3 to 5.2, has an absorbance of 0.6 or less for light having a wavelength of 700 nm as an aqueous dispersion having a concentration of 1.48 mass %, and has a particle density measured with a He pycnometer of 2.18 g/cm³ or more:

$$R = {}^{L}D50/{}^{C}D50 \qquad \text{Equation (1)}$$

in the equation (1), $^{L}D50$ represents a volume-based 50% cumulative particle diameter (μm) of the silica measured based on a laser diffraction/scattering method, and $^{C}D50$ represents a volume-based 50% cumulative particle diameter (μm) of the silica measured based on a Coulter counter method.

In the silica according to one embodiment of the present invention, it is preferred that the volume-based 50% cumulative particle diameter $^{L}D50$ be 1.7 μm or more.

In the silica according to another embodiment of the present invention, it is preferred that the silica have a bulk density of 35 g/L or more.

In the silica according to another embodiment of the present invention, it is preferred that the silica be for use as a matting agent for a paint.

In the silica according to another embodiment of the present invention, it is preferred that the paint including the silica according to the embodiment of the present invention be any one paint selected from the group consisting of: a clear paint; and a black-colored paint.

According to one embodiment of the present invention, there is provided a paint, including at least: a matting agent; and a resin, wherein the matting agent contains a silica, which has a structure in which primary particles are aggregated, has a particle diameter ratio R represented by the following equation (1) of from 4.3 to 5.2, has an absorbance of 0.6 or less for light having a wavelength of 700 nm as an aqueous dispersion having a concentration of 1.48 mass %, and has a particle density measured with a He pycnometer of 2.18 g/cm³ or more:

$$R = {}^{L}D50/{}^{C}D50 \qquad \text{Equation (1)}$$

in the equation (1), $^{L}D50$ represents a volume-based 50% cumulative particle diameter (μm) of the silica measured based on a laser diffraction/scattering method, and $^{C}D50$ represents a volume-based 50% cumulative particle diameter (μm) of the silica measured based on a Coulter counter method.

In the paint according to one embodiment of the present invention, it is preferred that the paint be any one selected from the group consisting of: a clear paint; and a black-colored paint.

According to one embodiment of the present invention, there is provided a method of producing a silica, including at least: a basic aqueous solution-adding step of adding a basic aqueous solution containing a basic substance at a concentration of 5 N or more within a range of from 4 parts by mass to 13 parts by mass with respect to 100 parts by mass of a fumed silica, which has an absorbance of 0.14 or less for light having a wavelength of 700 nm as an aqueous dispersion having a concentration of 1.48 mass %, and has a bulk density of from 40 g/L to 110 g/L; and a drying step of drying a wetted mixture, which is obtained by adding the basic aqueous solution to the fumed silica, through heating at a temperature equal to or higher than a boiling point of the basic substance.

In the method of producing a silica according to one embodiment of the present invention, it is preferred that the basic aqueous solution be ammonia water having a concentration of 5 N or more.

In the method of producing a silica according to another embodiment of the present invention, it is preferred that the method further include a milling step of milling a silica, which is obtained through the drying step, through use of a milling apparatus selected from the group consisting of: a jet mill; and a pin mill, wherein the milling step includes performing milling treatment until a volume-based 50% cumulative particle diameter $^{C}D50$ of the silica after an end of the milling treatment measured based on a Coulter counter method becomes 3.5 µm or less.

Advantageous Effects of Invention

According to the present invention, the silica that exhibits a high matting property when utilized as a matting agent for a paint, and can also suppress the occurrence of cloudiness, the paint using the silica, and the method of producing the silica can be provided.

DETAILED DESCRIPTION

1. Silica

A silica according to one embodiment of the present invention has an aggregated structure in which primary particles are aggregated, <1> has a particle diameter ratio R represented by the following equation (1) of from 4.3 to 5.2, <2> has an absorbance of 0.6 or less for light having a wavelength of 700 nm (the absorbance is hereinafter sometimes referred to as "τ700") as an aqueous dispersion having a concentration of 1.48 mass %, and <3> has a particle density measured with a He pycnometer of 2.18 g/cm³ or more:

$$R = {}^{L}D50/{}^{C}D50 \qquad \text{Equation (1)}$$

in the equation (1), $^{L}D50$ represents a volume-based 50% cumulative particle diameter (µm) of the silica measured based on a laser diffraction/scattering method, and $^{C}D50$ represents a volume-based 50% cumulative particle diameter (µm) of the silica measured based on a Coulter counter method.

When the silica according to this embodiment is used as a matting agent for a paint, by virtue of satisfying any one of the conditions described in <1> to <3> above, an improvement in matting property and/or the suppression of cloudiness can be easily achieved. Besides, when the conditions described in <1> to <3> are simultaneously satisfied, a high matting property is exhibited, and besides, the occurrence of cloudiness can be suppressed. Each of <1> the particle diameter ratio R, <2> the τ700, and <3> the particle density is described in detail below.

<1> Particle Diameter Ratio R

In the laser diffraction/scattering method to be used for the measurement of the particle diameter $^{L}D50$ shown in the equation (1), scattering occurs on the outermost surface of each individual particle serving as a measurement object. Accordingly, for the particle diameter measured by the laser diffraction/scattering method, a value extremely close to that of the particle diameter of the particle observed with, for example, a scanning electron microscope (SEM) is obtained. On the other hand, in the Coulter counter method to be used for the measurement of the particle diameter $^{C}D50$ shown in the equation (1), the size of a particle is measured on the basis of a change in electrical resistance at a time when the particle passes through an aperture. Accordingly, when the particle serving as the measurement object has a porous structure, a void portion in the particle is filled with an electrolytic solution used as a dispersion solvent utilized for the measurement (e.g., ISOTON II, which was used for the measurement of the particle diameter $^{C}D50$ to be described later). At this time, an electric current flows in the void portion, and hence the particle having a porous structure shows a significantly smaller value for the particle diameter $^{C}D50$ as compared to the particle diameter measured by the laser diffraction/scattering method or with the SEM. Accordingly, the particle diameter ratio R represented by the equation (1) may be said to be an indicator for evaluating the degree of the void that the particle serving as the measurement object has.

The silica according to this embodiment has a particle diameter ratio R represented by the equation (1) of from 4.3 to 5.2 as described above, and hence its primary particles are loosely bound, and besides, the silica has a bulky aggregated structure (porous structure having a high void ratio). Accordingly, the silica according to this embodiment has such a structure that the unevenness of the surface of each individual silica particle is large, and hence irregular reflection of light on the surface of the silica particle easily occurs, with the result that the matting property of a paint can be easily improved. Moreover, the number of silica particles contained per unit weight is also increased, and hence, even when the addition amount of the silica according to this embodiment with respect to the paint is small, an excellent matting effect can be easily exhibited. In addition, cloudiness of a coating film can be easily suppressed along with the improvement in matting property. Further, when a clear paint or black-colored paint using the silica according to this embodiment is used by being applied to a base material having a deep-colored application surface (deep-colored base material), a coating film having excellent jet blackness can be easily formed along with the exhibition of the matting effect.

From the viewpoint of further enhancing the improving effect on the matting property, the lower limit value of the particle diameter ratio R is preferably 4.5 or more, more preferably 4.7 or more. Meanwhile, as the particle diameter ratio R increases, the silica particles each have a bulkier aggregated structure, and hence, if such aggregated structure can be maintained as it is in the paint as well, a further improvement in matting property is expected. However, in the case where the particle diameter ratio R is excessively large, the bulky aggregated structure is liable to collapse owing to a shear force applied to the silica particles during stirring and mixing in the preparation of the paint, and hence, as a result, the matting property is degraded, and besides, cloudiness is liable to occur. For this reason, the particle diameter ratio R needs to be 5.2 or less, and is preferably 5.0 or less.

For reference, in a silica particle having an aggregated structure in which primary particles are aggregated, an oil absorption is generally used as an indicator for evaluating the porousness and bulkiness of the silica particle. However, the oil absorption may include the amount of oil present in a gap between the silica particles as well as the amount of oil absorbed by a void formed in each individual silica particle. In addition, the void formed in the silica particle is closely related to the matting property as described above, but the gap between the silica particles is not related to the matting property. Accordingly, the oil absorption does not precisely correspond to the size of the void of each individual silica particle, and is a parameter having a relatively lower correlation with the matting property as compared to the particle diameter ratio R.

<2> τ700

In addition, the silica according to this embodiment has an absorbance (τ700) of 0.6 or less for light having a wavelength of 700 nm as an aqueous dispersion having a concentration of 1.48 mass %. When the τ700 is set to 0.6 or less, the dispersibility of the silica particles in a paint is improved, and hence the effective area of the surfaces of the silica particles on which light is irregularly reflected can be made larger. Accordingly, the matting property can be easily improved, and moreover, cloudiness of the coating film can be easily suppressed along with the improvement in matting property. Further, when a clear paint or black-colored paint using the silica according to this embodiment is used by being applied to a base material having a deep-colored application surface (deep-colored base material), a coating film having excellent jet blackness can be easily formed along with the exhibition of the matting effect. In addition, in the case where the silica according to this embodiment is used for a paint containing a solvent, when the τ700 is set to 0.6 or less, a paint that is easy to apply to a base material and hardly sags after application can be easily obtained. The τ700 is preferably 0.5 or less, more preferably 0.4 or less. In addition, the lower limit value of the τ700 is not particularly limited, but the lower limit value of the τ700 is preferably 0.25 or more, more preferably 0.30 or more in practice.

<3> Particle Density

In addition, the silica according to this embodiment has a particle density measured with a He pycnometer of 2.18 g/cm³ or more. Consequently, cloudiness of the coating film can be easily suppressed. Further, the glossy feeling of the coating film is also more or less reduced along with the suppression of cloudiness, and hence, as a result, the matting property can also be easily improved. The reason why the suppression of cloudiness and the like can be easily achieved by setting the particle density to 2.18 g/cm³ or more is as described below.

First, the refractive index of pure amorphous silica (theoretical refractive index) is 1.46. Meanwhile, the refractive index of a urethane resin, which is widely utilized as a resin component to be used for a paint, is about 1.5. In addition, the refractive indices of various resins for paints other than the urethane resin are generally more than 1.46. In this connection, when a fine void is present inside each individual primary particle forming the aggregated structure of each of the silica particles, the refractive index of each of the silica particles decreases in proportion to the presence of the void. For this reason, when a coating film is formed from a paint using such silica particles, a refractive index difference between the resin and each of the silica particles forming the paint is increased, and the coating film is clouded owing to such refractive index difference. Accordingly, the refractive index of each of the silica particles is preferably as close as possible to the theoretical refractive index, i.e., 1.46. For that purpose, it is desired that the void inside each individual primary particle forming the aggregated structure of each of the silica particles be small. In this connection, that the void inside the primary particle is small means that the particle density of the primary particle is high. For this reason, the particle density of the silica according to this embodiment is set to 2.18 g/cm³ or more.

For reference, when the particle density is measured with a He pycnometer, a compressed product obtained by compressing the silica particles at high pressure to destroy the aggregated structure is used as a sample for measurement. Accordingly, the particle density measured with the He pycnometer substantially nearly corresponds to the density of the primary particles forming the silica particles.

The particle density is preferably 2.185 g/cm³ or more, more preferably 2.19 g/cm³ or more. The upper limit value of the particle density is not particularly limited, but in practice, is preferably 2.21 g/cm³ or less, which is a value close to the true density of amorphous silica, and may be 2.205 g/cm³ or less.

The silica according to this embodiment needs to have such a size that at least visible light is not transmitted in order to exhibit a matting property, and hence it is appropriate that its average particle diameter be at least larger than the wavelength region of visible light (from about 0.4 μm to about 0.76 μm). The matting property is exhibited through the scattering of light entering from the outside by parts of the silica particles protruding with respect to the surface of the coating film among the silica particles that are partially buried in the surface of the coating film. That is, only those parts of the silica particles that are somewhat smaller than parts corresponding to actual particle diameters (parts of the silica particles protruding with respect to the surface of the coating film) contribute to the scattering of light. Accordingly, in view of this, the particle size of the silica according to this embodiment is preferably somewhat larger than the wavelength region of visible light in order to more reliably exhibit a matting property, and specifically, is preferably 1.7 μm or more, more preferably 3.0 μm or more, still more preferably 5.0 μm or more in terms of particle diameter $^{L}$D50. The upper limit value of the particle diameter $^{L}$D50 is not particularly limited, but is preferably 25.0 μm or less in practice.

The Ph of the silica according to this embodiment is not particularly limited, but the silica generally shows a Ph in the vicinity of a weakly acidic to weakly basic region, and a Ph value in the case where the silica according to this embodiment is dispersed in water and subjected to measurement falls within the range of from about 5.5 to about 9.5. Details of a measurement method for the Ph are described later.

The bulk density of the silica according to this embodiment is not particularly limited, but its lower limit value is preferably 35 g/L or more, more preferably more than 36 g/L, still more preferably 43 g/L or more. Meanwhile, its upper limit value is not particularly limited, but is preferably 70 g/L or less, more preferably 65 g/L or less in practice. When the bulk density is set to 35 g/L or more, in the case where a matting agent formed of the silica according to this embodiment is to be dispersed in a resin composition for a paint, it becomes easy to prevent a failure of the silica to be uniformly dispersed, or shorten the time required for the silica to be uniformly dispersed.

2. Paint

The silica according to this embodiment may be utilized in various applications, but in particular, is suitably used as a matting agent for a paint. In this case, a paint according to this embodiment contains at least the matting agent (the silica according to this embodiment) and a resin. In addition, the paint according to this embodiment may be any of a colored paint containing a coloring material, such as a pigment or a dye, a clear paint that is free of any coloring material (colorless and transparent), or a clear paint that contains a minute amount of a coloring material within a range in which the transparency of the coating film is not impaired (slightly colored). Further, when the paint according to this embodiment is liquid, the paint further contains a solvent, such as water or an organic solvent. In addition, the paint according to this embodiment may contain various additives other than the silica according to this embodiment, which is used as the matting agent.

The paint according to this embodiment may be utilized in the form of, for example, a solvent-type paint, an ultraviolet (UV)-curable paint, or a powder paint, and specifically, may be utilized in the form of, for example, an aqueous paint, an oily paint, a nitrocellulose paint, an alkyd resin paint, an amino alkyd paint, a vinyl resin paint, an acrylic resin paint, an epoxy resin paint, a polyester resin paint, or a chlorinated rubber-based paint. Of those, a vinyl chloride paint or a urethane paint, which is used as a paint for synthetic leather, is preferred as the paint according to this embodiment.

As the resin for forming the paint, any resin may be utilized without particular limitations as long as the resin is used for a paint, and examples thereof include one kind or two or more kinds selected from a rosin, an ester gum, a pentaresin, a coumarone-indene resin, a phenol-based resin, a modified phenol-based resin, a maleic resin, an alkyd-based resin, an amino-based resin, a vinyl-based resin, a petroleum resin, an epoxy-based resin, a polyester-based resin, a styrene-based resin, an acrylic resin, a silicone-based resin, a rubber-based resin, a chlorinated resin, a urethane-based resin, a polyamide-based resin, a polyimide-based resin, a fluorine-based resin, and a natural or synthetic lacquer.

In the ultraviolet curable paint, in general, high solid resins, such as a UV-curable acrylic resin, an epoxy resin, a vinylurethane resin, an acrylic urethane resin, and a polyester resin, may be used alone or in combination thereof. In addition, in the powder paint, for example, an epoxy resin, an epoxy/novolac resin, or an isocyanate or epoxy-curable polyester resin is blended in addition to a thermoplastic resin, such as polyamide, polyester, an acrylic resin, an olefin resin, a cellulose derivative, polyether, or a vinyl chloride resin.

In addition, when the paint according to this embodiment is the solvent-type paint, an organic solvent is used as a solvent. Examples of the organic solvent include: aromatic hydrocarbon-based solvents, such as toluene and xylene; aliphatic hydrocarbon-based solvents, such as n-heptane, n-hexane, and ISOPAR; alicyclic hydrocarbon-based solvents such as cyclohexane; ketone-based solvents, such as acetone, methyl ethyl ketone, methyl isobutyl ketone, and cyclohexanone; alcohol-based solvents, such as ethanol, propanol, butanol, and diacetone alcohol; ether-based solvents, such as tetrahydrofuran and dioxane; cellosolve-based solvents, such as ethyl cellosolve and butyl cellosolve; ester-based solvents, such as ethyl acetate and butyl acetate; and aprotic polar solvents, such as dimethylformamide, dimethylacetamide, and dimethyl sulfoxide.

When the silica according to this embodiment is blended as a matting agent into a paint, its blending amount is appropriately set in view of various physical properties required as a paint, but is generally preferably from 5 parts by mass to 33 parts by mass, more preferably from 10 parts by mass to 30 parts by mass with respect to 100 parts by mass of a solid content in the paint. When the blending amount is set to 5 parts by mass or more, the matting property can be more easily exhibited, and when the blending amount is set to 33 parts by mass or less, the securement of the strength of the coating film and the suppression of cloudiness can be easily achieved.

The paint according to this embodiment may be utilized as various kinds of paints as described above, but is particularly suitably used as a clear paint or a black-colored paint. When a coating film is formed on a base material having a deep-colored application surface of a paint (deep-colored base material) through use of the paint according to this embodiment as a clear paint or a black-colored paint, a coating film having high jet blackness can also be obtained.

A material for the deep-colored base material is not particularly limited as long as the base material has an application surface having a deep color, such as a black color, a deep blue color, a crimson color, or a dark green color, but for example, a base material formed of synthetic leather is suitable. In addition, when the paint according to this embodiment is used as a clear paint, a minute amount of a black pigment, such as carbon black or aniline black, may be added to the paint according to this embodiment within a range in which the transparency of the coating film is not impaired. In this case, the degree of jet blackness of the coating film can also be further enhanced.

When the deep-colored base material is made of synthetic leather, the paint according to this embodiment to be used as a clear paint or a black-colored paint is suitably a vinyl chloride paint or a urethane paint as described above. In general, among the urethane paints, an aromatic urethane paint is relatively inexpensive and also has high weather resistance, but an aliphatic urethane paint is generally used from the standpoint of external appearance such as jet blackness. However, when a urethane paint containing an aromatic urethane resin having the silica according to this embodiment added thereto as a matting agent is used, a coating film having high jet blackness comparable to that of a urethane paint containing an aliphatic urethane resin having a related-art silica added thereto as a matting agent can even be easily obtained.

3. Method of Producing Silica

The silica according to this embodiment is not particularly limited as long as the silica is produced through a process of aggregating raw material particles. The raw material particles are particles corresponding to the primary particles forming the aggregated structure in the silica according to this embodiment. In this case, a fumed silica is generally used as the raw material particles. The fumed silica is produced by hydrolyzing a silica precursor such as a silane compound in a flame. The fumed silica is treated at extremely high temperature during its production, and hence is distinguished from wet process silica obtained by forming silica in an aqueous medium. As the fumed silica, any fumed silica may be used, but a fumed silica that has not been subjected to surface treatment with a surface treatment agent such as a hydrophobizing treatment agent is suitably used.

However, from the viewpoint that the silica according to this embodiment can be easily obtained, a method of producing the silica according to this embodiment particularly preferably involves producing the silica through at least: a basic aqueous solution-adding step of adding a basic aqueous solution containing a basic substance at a concentration of 5 N or more within the range of from 4 parts by mass to 13 parts by mass with respect to 100 parts by mass of a fumed silica, which has an absorbance of 0.14 or less for light having a wavelength of 700 nm as an aqueous dispersion having a concentration of 1.48 mass %, and has a bulk density of from 40 g/L to 110 g/L; and a drying step of drying a wetted mixture, which is obtained by adding the basic aqueous solution to the fumed silica, through heating at a temperature equal to or higher than the boiling point of the basic substance. After the drying step, it is generally preferred to perform a milling step and a classification step as appropriate in order to obtain a silica having a desired particle diameter and particle size distribution. Details of each step are described below.

In the basic aqueous solution-adding step, a fumed silica, which has an absorbance ($\tau 700$) of 0.14 or less for light having a wavelength of 700 nm as an aqueous dispersion having a concentration of 1.48 mass %, and has a bulk density of from 40 g/L to 110 g/L, is used as the raw material particles. When the fumed silica satisfying the above-mentioned conditions is used, the silica according to this embodiment can be easily produced.

The particle density (value measured with a He pycnometer) of the fumed silica to be used as the raw material particles is generally from 2.20 g/cm³ to 2.21 g/cm³. Accordingly, the particle density of the silica (aggregate of primary particles) to be produced using the fumed silica as the raw material particles can be easily controlled to 2.18 g/cm³ or more.

In addition, when the bulk density of the fumed silica is set to from 40 g/L to 110 g/L, the particle diameter ratio R of the silica to be obtained can be more easily controlled to fall within the range of from 4.3 to 5.2. The bulk density is preferably from 50 g/L to 100 g/L. In addition, when the $\tau 700$ of the fumed silica is set to 0.14 or less, the $\tau 700$ of the silica to be obtained can be easily controlled to 0.6 or less. The $\tau 700$ is preferably 0.13 or less, and its lower limit value is not particularly limited, but is preferably 0.06 or more in practice.

Many fumed silicas that are generally commercially available have a $\tau 700$ of 0.14 or less. Any such silica has a small particle diameter and has satisfactory dispersibility in an aqueous medium, and hence the value of the $\tau 700$ is considerably small as compared to that of the silica according to this embodiment.

In addition, in the case where a fumed silica having a bulk density of less than 40 g/L is used as the raw material particles, a treatment apparatus having a large volume needs to be used when the raw material particles are subjected to aggregation treatment through addition of a basic aqueous solution. Moreover, the bulk density of the produced silica is also reduced. Besides, in the case where a silica having a low bulk density is used as a matting agent, when dispersed in a resin composition for a paint, the silica remains in a state of floating on the resin composition and its dispersion in the resin composition is markedly inhibited, with the result that the silica takes time to be uniformly dispersed in the resin composition, or is not dispersed in the resin composition at all in some cases. Further, when a fumed silica having a bulk density of less than 40 g/L is used as the raw material particles, the cost of a production apparatus is increased, and besides, a filling weight in the packaging of the produced silica is reduced, and hence transportation cost is also liable to be increased.

In general, fumed silica has an extremely low bulk density, and hence, when a fumed silica having a low bulk density is to be treated with a basic aqueous solution, a large amount of the basic aqueous solution is required. Besides, in the case where a large amount of the basic aqueous solution is added to the fumed silica, the silica to be produced undergoes marked contraction during evaporative drying of the basic aqueous solution in the drying step serving as the next step, and hence a silica having a bulky aggregated structure is liable to become difficult to obtain. Accordingly, it is also suitable from such viewpoint that the bulk density be set to 40 g/L or more. When the bulk density of an obtained fumed silica is less than 40 g/L, it is appropriate that a product obtained by compressing the fumed silica with a degassing press machine or the like to adjust the bulk density to fall within the range of from 40 g/L to 110 g/L be used in the basic aqueous solution-adding step.

In addition, the fumed silica to be used as the raw material particles generally has a specific surface area of preferably from about 190 m²/g to about 500 m²/g, particularly preferably from 220 m²/g to 400 m²/g. Meanwhile, the specific surface area of the silica according to this embodiment tends to be smaller than that of the fumed silica used as the raw material particles because of the occurrence of dissolution of the surfaces of the raw material particles through the action of the added basic aqueous solution, and is generally from 180 m²/g to 350 m²/g. Further, the fumed silica to be used as the raw material particles preferably contains few coarse particles, and it is particularly preferred that 0.01 wt % or less of the fumed silica remain on a sieve having an aperture of 45 μm according to Mocker's sieve method.

In the basic aqueous solution-adding step, a basic aqueous solution containing a basic substance at a concentration of 5 N or more is added within the range of from 4 parts by mass to 13 parts by mass with respect to 100 parts by mass of the above-mentioned fumed silica having a $\tau 700$ of 0.14 or less and a bulk density of from 40 g/L to 110 g/L. The addition amount of the basic aqueous solution is suitably from 4.5 parts by mass to 8 parts by mass.

When the addition amount of the basic aqueous solution is set to 4 parts by mass or more, the fumed silica used as the raw material particles can be easily treated in a uniform manner, and hence the silica according to this embodiment can be stably obtained. Moreover, the particle diameter ratio R can be easily controlled to 4.3 or more. In addition, when the addition amount of the basic aqueous solution is set to 13 parts by mass or less, in the drying step serving as the next step, energy required in performing drying treatment can be saved, and/or a drying time can be shortened. Accordingly, the raw material particles treated with the basic aqueous solution can be suppressed from strongly aggregating with each other, and as a result, the silica according to this embodiment can be stably obtained. In addition, the particle density of the silica according to this embodiment empirically tends to be slightly decreased as compared to the particle density of the fumed silica used as the raw material particles, and particularly when a large amount of a basic aqueous solution having a high concentration is used, the decrease in particle density tends to be remarkable. Accordingly, it is suitable from such viewpoint as well that the addition amount of the basic aqueous solution be set to 13 parts by mass or less. Details of the reason for the decrease in particle density are unknown, but a presumable cause is that raw material particles having their structures slightly altered by, for example, dissolution of the surface of the fumed silica through the action of the base serve as the primary particles of the silica (aggregate).

The surfaces of the raw material particles to which the basic aqueous solution has been added are dissolved through the action of the base, and further, part of the dissolved surfaces are bound to other raw material particles to form an aggregate. Such aggregation is not very firm, and hence a silica having a bulky and loose aggregated structure is obtained.

When the raw material particles are wetted with the basic aqueous solution by adding the basic aqueous solution to the raw material particles, heating treatment may be performed at a temperature lower than the boiling point of water.

In addition, a solution containing a basic substance at a concentration of 5 N or more is used as the basic aqueous solution. By virtue of setting the concentration to 5 N or more, the above-mentioned dissolution and formation of an aggregate are sufficiently promoted, and as a result, the silica according to this embodiment can be stably obtained. Moreover, the $\tau700$ can be particularly easily controlled to 0.6 or less. The concentration is preferably 7 N or more, more preferably 10 N or more. Meanwhile, the upper limit value of the concentration is preferably 20 N or less from the viewpoint of practicality.

From the viewpoint that the basic substance can be easily removed from the surface of the aggregate of the raw material particles through heating treatment in the drying step serving as the next step, the basic substance is preferably ammonia, or a water-soluble amine, such as methylamine, dimethylamine, ethylenediamine, tetramethylammonium, or tetraethylammonium, particularly preferably ammonia. For example, when the basic aqueous solution is 10 mass % ammonia water, the concentration of ammonia serving as the basic substance is about 5.6 N. In consideration of, for example, the ease of availability and preparation, the basic aqueous solution is preferably ammonia water having a concentration of 5 N or more, and in terms of concentration converted into ammonia content (mass %), the basic aqueous solution is preferably ammonia water having a concentration of 9.8 mass % or more, more preferably ammonia water having a concentration of 10 mass % or more, still more preferably ammonia water having a concentration of 20 mass % or more.

At the time of the addition of the basic aqueous solution, it is preferred that the basic aqueous solution be sprayed under a state in which the raw material particles in a container are, for example, stirred with a stirring blade or subjected to a gas flow, to thereby bring the basic aqueous solution into uniform contact with the raw material particles. At the time of the spraying, addition with a single-fluid nozzle or a two-fluid nozzle, or an ultrasonic spray is simple and preferred. In this case, it is more preferred to make a choice so that the average particle diameter of a spray liquid may be 100 μm or less. Further, the basic aqueous solution may be intermittently supplied into a reaction vessel container having placed therein the raw material particles, or may be continuously supplied thereinto.

With a view to appropriately causing the dissolution of the surfaces of the raw material particles and the aggregation between the raw material particles, a reaction temperature needs to fall within a range in which the basic aqueous solution is liquid, and hence is generally preferably from about 15° C. to about 85° C. In addition, when a reaction time is excessively short, the dissolution or the like hardly occurs, and when the reaction time is excessively long, the aggregation tends to proceed excessively. Accordingly, the reaction is preferably performed within the range of from 0.4 hour to 3 hours. The term "reaction time" as used herein refers to a period of time from the time point at which the basic aqueous solution is added to the raw material particles to the time point at which heating is started in order to perform the drying step serving as the next step. A pressure when the contact treatment between the basic aqueous solution and the raw material particles is performed is not particularly limited, and may be appropriately selected within the range of from a negative pressure to an increased pressure. In addition, the contact treatment may be performed in a batch manner or a continuous manner.

After the contact treatment between the basic aqueous solution and the fumed silica used as the raw material particles has been finished in the basic aqueous solution-adding step, the drying step is performed. In the drying step, a wetted mixture obtained by adding the basic aqueous solution to the fumed silica is dried through heating at a temperature equal to or higher than the boiling point of the basic substance. However, when the boiling point of the basic substance contained in the basic aqueous solution used is lower than the boiling point of water, the heating in the drying step needs to be performed at a temperature equal to or higher than the boiling point of water. For example, when the basic substance is ammonia (having a boiling point of about −33° C. under atmospheric pressure) and the drying step is performed under atmospheric pressure, the drying step is performed through heating to a temperature equal to or higher than the boiling point of water (which is 100° C. under atmospheric pressure). When heating treatment is performed as just described, the basic substance can be quickly and sufficiently removed from the surface of the aggregate of the raw material particles. In addition, consequently, the progress of excessive aggregation in the drying step can be suppressed, and hence, even in the case of performing the basic aqueous solution-adding step using the basic aqueous solution containing a basic substance at a high concentration of 5 N or more, the particle diameter ratio R, the $\tau700$, and the particle density of the silica to be obtained can be more easily controlled to fall within the ranges of from 4.3 to 5.2, 0.6 or less, and 2.18 g/cm$^3$ or more, respectively. Besides, as a result, it becomes easy to stably obtain the silica according to this embodiment.

In the case where the boiling point of the basic substance contained in the basic aqueous solution used is lower than the boiling point of water, when the drying step is performed under atmospheric pressure, a heating temperature only needs to be 100° C. or more, but is preferably 150° C. or more. When the heating temperature is set to 100° C. or more, the drying time can be reduced, and besides, the removal of the basic substance can be sufficiently performed. When the drying step is performed under a pressure other than atmospheric pressure, the heating temperature only needs to be equal to or higher than the boiling point of water under the pressure, and is preferably the boiling point of water under the pressure+50° C. or more. In addition, the upper limit value of the heating temperature at the time of the drying treatment is not particularly limited, but is preferably 300° C. or less in consideration of the physical heat resistance of a heating apparatus to be used for the drying treatment. In addition, at the time of the drying treatment, temperature increase to the target heating temperature is preferably performed at a temperature increase rate of 100° C./hr or less, and the drying treatment is suitably performed under an inert gas atmosphere by, for example, supplying an inert gas such as a nitrogen gas at the time of the drying treatment.

The silica obtained through the drying step (aggregate in which primary particles corresponding to the raw material particles are aggregated) is generally preferably subjected to a milling step in order to adjust its particle diameter and particle size distribution. As a milling apparatus, a milling apparatus that hardly causes the compression of powder serving as a milling object, such as a jet mill or a pin mill, is preferably used, and a jet mill is particularly preferred. In addition, when the silica after the drying treatment is milled using such milling apparatus, a loose correlation is observed between the particle diameter $^CD50$ and the particle diameter ratio R, and as the particle diameter $^CD50$ becomes smaller, the particle diameter ratio R tends to increase.

In this case, in general, when the milling treatment is performed until the particle diameter $^CD50$ becomes 4.0 μm or less, the particle diameter ratio R can be easily controlled to 4.3 or more. In order to more reliably control the particle diameter ratio R to 4.3 or more, the milling treatment is performed until the particle diameter $^CD50$ at the end of the milling treatment becomes more preferably 3.5 μm or less, still more preferably 2.6 μm or less, particularly preferably 1.8 μm or less. Meanwhile, from the viewpoint of practicality such as avoiding a decrease in productivity due to an increase in milling treatment time, the milling treatment is performed within such a range that the particle diameter $^CD50$ at the end of the milling treatment becomes preferably 0.8 μm or more, more preferably 1.1 μm or more, still more preferably 1.2 μm or more. When such circumstances regarding the production process as described above are taken into consideration, as a consequence, the particle diameter $^CD50$ of the silica according to this embodiment is preferably from 1.1 μm to 3.5 μm, more preferably from 1.2 μm to 2.6 μm, still more preferably from 1.2 μm to 1.8 μm.

In addition, the silica obtained through the drying step, or the silica obtained through the milling step may be subjected to a classification step as required in order to remove coarse particles contained in the silica. In addition, prior to the basic aqueous solution-adding step, a stirring and mixing step of stirring and mixing the raw material particles through use of a Henschel mixer or the like may be performed.

EXAMPLES

The present invention is described in detail below by way of Examples. However, the present invention is not limited to these Examples. Measurement methods for various physical property values/characteristic values in Examples and Comparative Examples to be described later are as described below.

I. Evaluation of Various Physical Property Values

Various physical properties of fumed silicas used as raw material particles in Examples and Comparative Examples, and silicas blended into paints therein were measured as described below.

1. Specific Surface Area

A specific surface area was measured by a nitrogen adsorption BET one-point method through use of a specific surface area-measuring apparatus manufactured by Sibata Scientific Technology Ltd. (SA-1000).

2. Absorbance (τ700) of Aqueous Dispersion Having Concentration of 1.48 mass % for Light Having Wavelength of 700 nm The measurement of τ700 was performed by a measurement method disclosed in Journal of Ceramic Society of Japan 101[6], 707-712 (1993). Specifically, 0.3 g of a powder sample and 20 ml of distilled water were loaded into a sample vial made of glass (manufactured by AS ONE Corporation, internal volume: 30 ml, outer diameter: about 28 mm). Next, the probe tip of an ultrasonic cell disruptor (Digital Sonifier Model 250 manufactured by Branson, probe: ¼-inch microtip) was placed at a position 10 mm below the water surface of the mixture of 0.3 g of the powder sample and distilled water loaded in the sample vial. Under this state, ultrasonic stirring was performed under the conditions of an output of 39% (30 W) and a dispersion time of 180 seconds to provide an aqueous dispersion in which 0.3 g of the powder sample was finely dispersed in distilled water (powder sample 0.3 g concentration: 1.48 mass %). Subsequently, the absorbance of the resultant aqueous dispersion for light having a wavelength of 700 nm was measured using a spectrophotometer (manufactured by JASCO Corporation, V-530). A measurement cell used for the measurement of the absorbance was a quartz cell having a side surface formed of obscure glass, and having an optical path length of 10 mm.

3. Bulk Density (ρ)

The measurement of a bulk density was performed by the following procedure. First, a resinous graduated cylinder having a volume of 1 L was placed on an electronic balance, and then tared. Next, about 1 L of a powder sample was loaded into the resinous graduated cylinder, and a weight M (g) was recorded. Then, the resultant was tapped 30 times by hand at a tapping height (drop distance) of 10 cm, and then a volume V (ml) was measured. The bulk density p was calculated on the basis of the following equation (2).

$$\text{Bulk density} \rho = 1,000 \times M/V(\text{g/L}) \qquad \text{Equation (2)}$$

4. Volume-Based 50% Cumulative Diameter ($^LD50$) Based on Laser Diffraction/Scattering Method A particle diameter $^LD50$ was measured using a laser diffraction/scattering type particle size distribution-measuring apparatus (manufactured by Horiba, Ltd., LA950V2). The internal set values of LA950V2 were set to the following conditions: Circulation: 5, Agitation: 7, and UltraSonic: 4 minutes. In addition, at the time of the measurement, 0.1 g of dried silica powder was directly put into the apparatus and subjected to the measurement.

5. Volume-based 50% Cumulative Particle Diameter ($^CD50$) Based on Coulter Counter Method The measurement of a particle diameter $^CD50$ was performed by the following procedure. First, a mixture of 50 g of methanol and 0.2 g of silica powder was subjected to dispersion treatment using an ultrasonic cleaner (manufactured by Emerson Japan, Ltd., B1510J-MT) for 3 minutes to prepare an alcohol dispersion. Next, the particle diameters of silica particles dispersed in the alcohol dispersion were measured with a particle size distribution-measuring apparatus (manufactured by Coulter, Inc., model TA II) using a 50 μm aperture tube. ISOTON II was used as the electrolytic solution of the particle size distribution-measuring apparatus.

6. Particle Density Based on He Pycnometer

The measurement of a particle density was performed by the following procedure. First, a powder sample serving as a measurement object was loaded into a press mold made of a cemented carbide (50 mm in diameter×75 mm in height), and then the powder sample serving as the measurement object was subjected to compression molding (uniaxial pressing) under a pressure of 15 ton through use of a press apparatus (manufactured by Masada Seisakusho Co., Ltd., MH-15TON press (ram diameter: 55 mm)). After the pressure had been applied for about 2 seconds, the powder sample subjected to the compression treatment was taken out of the mold. Next, the silica subjected to the compression treatment was subjected to drying treatment in a vacuum dryer at a temperature of 200° C. under a pressure of −0.095 PaG or less for 8 hours, and was allowed to cool to room temperature in the vacuum dryer under reduced pressure. Thus, a measurement sample was obtained.

The obtained measurement sample was subjected to measurement with a dry automatic densimeter (manufactured by Shimadzu Corporation, model: AccuPyc1330) using a 10 ml sample insert and a He gas having a pressure of 0.16 Pa. The measurement temperature of the densimeter at the time of density measurement was kept at 25° C. by constant-temperature water circulation.

7. pH

The measurement of a pH was performed by the following procedure. First, 100 ml of degassed pure water was added to 5 g of a powder sample, and the mixture was stirred with a stirrer for 10 minutes to prepare a slurry for pH measurement. Next, the pH of the slurry was measured using a PH meter model F-52 manufactured by Horiba, Ltd. Standard solutions having a pH of 4 and a pH of 9 were used for the calibration of the pH meter.

8. Dibutyl Phthalate (DBP) Oil Absorption

The DBP oil absorption of silica powder was measured using an oil absorption-measuring apparatus model H5000 manufactured by Asahisouken Corporation on the basis of JIS K6217-4.

II. Evaluation of Various Physical Property Values/Characteristic Values of Paint and Coating Film In order to evaluate various physical property values/characteristic values of a paint and a coating film, the paint and the coating film were prepared by the following procedures.

<Preparation of Paint>

A mixture obtained by mixing 50 g of a resin composition for a paint (manufactured by Dainichiseika Color & Chemicals Mfg. Co., Ltd., Leatheroid LU-1500 (aromatic urethane paint resin, solid content: 20%)), 33.3 g of methyl ethyl ketone (MEK), 16.7 g of dimethylformamide (DMF), and 2.5 g of the silica powder of each of Examples and Comparative Examples was subjected to dispersion treatment with a homomixer at 8,000 rpm (peripheral speed: 11.7 m/S) for 6 minutes to prepare a paint (clear paint).

<Preparation of Coating Film>

Urethane synthetic leather whose surface to be coated had a black color was coated with the above-mentioned paint using a bar coater No. 14. Subsequently, after the coating, the resultant was subjected to drying treatment at 60° C. for 1 hour, and further, was left to stand at room temperature for 12 hours to provide urethane synthetic leather having a coating film formed on its coated surface. The coated surface of the urethane synthetic leather used for the formation of the coating film has an L* value of 25.0 and a gloss value (gloss value at an incident angle of 60°) of 3.5%. The L* value and gloss value of the coated surface of the urethane synthetic leather are values measured by measurement methods described below.

9. Fineness Gauge Value

A fineness gauge value was measured for the paint using a 100 μm fineness gauge on the basis of JIS K 5600-2-5.

10. Viscosity and TI

Viscosities were measured for the paint after having been left to stand in a thermostatic water bath at 25° C. for 2 hours through use of a BL-type rotary viscometer at 25° C. under the conditions of 60 rpm and 6 rpm. Table 3 and Table 4 show viscosities measured at 60 rpm. In addition, a value obtained by dividing the viscosity at 6 rpm by the viscosity at 60 rpm was determined as a thixotropic index (TI).

11. L*Value

An L* value was measured with a spectrocolorimeter (manufactured by Konica Minolta, Inc., model: CM-5) for the coating film-formed surface of the urethane synthetic leather having a coating film formed thereon. L*a*b* (CIE1976) was used as a color system, and the L* value was measured by SCI at a measurement diameter of 8 mm (value including specularly reflected light). The L* value is an indicator of the degree of jet blackness.

12. Gloss Value

A gloss value was measured for the coating film-formed surface of the urethane synthetic leather having a coating film formed thereon in conformity with JIS Z 8741. At the time of the measurement, glossiness (gloss value) at an incident angle of 60° was evaluated using a glossiness meter (manufactured by RHOPINT, model: IQ3).

13. Visual Evaluation

The coating film-formed surface of the urethane synthetic leather having a coating film formed thereon was evaluated through visual observation. Evaluation criteria are as follows.

A: The surface is more excellent in jet blackness as compared to a case of the following rank B.

B: No white portion is recognized throughout the entire surface, and the surface has a sufficient matting property and sufficient jet blackness.

C: Cloudiness or the like is observed in part of the surface.

D: Cloudiness or the like is observed over the entire surface.

Example 1

A fumed silica having a specific surface area of 300 m²/g, a τ700 of 0.084, a bulk density of 75 g/L, and a particle density of 2.209 g/cm³ was used as raw material particles. 5 Kg of the raw material particles were loaded into a Henschel mixer having an internal volume of 300 L, and were stirred and mixed, followed by the introduction of a nitrogen gas into the mixer to replace the ambient gas in the mixer with the nitrogen gas. Subsequently, under a state in which the temperature in the mixer was heated to 80° C., 250 ml of ammonia water having a concentration of 25 mass % was supplied into the mixer at a flow rate of 500 ml/hr through use of a single-fluid nozzle to provide a wetted mixture of the raw material particles wetted with ammonia water. The fumed silica used as the raw material particles in Example 1 is free of any surface treatment. The same holds true for fumed silicas used as raw material particles in other Examples and Comparative Examples.

Subsequently, while the stirring of the wetted mixture was continued and nitrogen was supplied into the mixer at 40 L/hr, the temperature was increased to 180° C. at 100° C./hr. Then, the inside of the mixer was kept at 180° C. for 1 hour to provide silica powder subjected to drying treatment. Next, the silica powder after drying treatment was milled with a jet mill (manufactured by Seishin Enterprise Co., Ltd., model: STJ315), and the particle diameter ᶜD50 thereof was adjusted to 1.4 μm. Thus, silica powder of Example 1 was obtained. When no particular description is given of a jet mill used in Examples and Comparative Examples described below, the model STJ315 manufactured by Seishin Enterprise Co., Ltd. was used.

Example 2

Silica powder of Example 2 was obtained by performing the same process as in Example 1 except that, in the milling step, milling was performed with the jet mill so that the particle diameter ᶜD50 became 2.6 μm.

Example 3

Silica powder of Example 3 was obtained by performing the same process as in Example 1 except that: a fumed silica having a specific surface area of 300 m²/g, a τ700 of 0.084, a bulk density of 61 g/L, and a particle density of 2.209 g/cm³ was used as the raw material particles; and 340 ml of ammonia water having a concentration of 18 mass % was added as a basic aqueous solution to the raw material particles.

Example 4

Silica powder of Example 4 was obtained by performing the same process as in Example 1 except that: a fumed silica having a specific surface area of 250 m$^2$/g, a $\tau$700 of 0.114, a bulk density of 85 g/L, and a particle density of 2.205 g/cm$^3$ was used as the raw material particles; and 223 ml of ammonia water having a concentration of 25 mass % was added as a basic aqueous solution to the raw material particles.

Example 5

The basic aqueous solution-adding step and the drying step were performed in the same manner as in Example 1 except that: the concentration of the ammonia water used as a basic aqueous solution to be added to the raw material particles was changed to 9.8 mass %; and the amount of the ammonia water added to the raw material particles was changed to 600 ml. After that, the silica after drying treatment was milled with the jet mill so that the particle diameter $^C$D50 became 1.3 μm. Thus, silica powder of Example 5 was obtained.

Example 6

The basic aqueous solution-adding step and the drying step were performed in the same manner as in Example 1 except that a fumed silica having a specific surface area of 300 m$^2$/g, a $\tau$700 of 0.084, a bulk density of 100 g/L, and a particle density of 2.209 g/cm$^3$ was used as the raw material particles. After that, the silica after drying treatment was milled with the jet mill so that the particle diameter $^C$D50 became 1.1 μm. Thus, silica powder of Example 6 was obtained.

Example 7

The basic aqueous solution-adding step and the drying step were performed in the same manner as in Example 1 except that a fumed silica having a specific surface area of 380 m$^2$/g, a $\tau$700 of 0.067, a bulk density of 55 g/L, and a particle density of 2.210 g/cm$^3$ was used as the raw material particles. After that, the silica after drying treatment was milled with the jet mill so that the particle diameter $^C$D50 became 1.2 μm. Thus, silica powder of Example 7 was obtained.

Example 8

Silica powder of Example 8 was obtained by performing the same process as in Example 1 except that the silica after drying treatment was milled with the jet mill so that the particle diameter $^C$D50 became 3.5 μm.

Example 9

The basic aqueous solution-adding step and the drying step were performed in the same manner as in Example 1 except that: a fumed silica having a specific surface area of 225 m$^2$/g, a $\tau$700 of 0.128, a bulk density of 110 g/L, and a particle density of 2.203 g/cm$^3$ was used as the raw material particles; and 500 ml of ammonia water having a concentration of 14 mass % was added as a basic aqueous solution to the raw material particles. After that, the silica after drying treatment was milled with the jet mill so that the particle diameter $^C$D50 became 3.3 μm. Thus, silica powder of Example 9 was obtained.

Example 10

The basic aqueous solution-adding step and the drying step were performed in the same manner as in Example 1 except that: a fumed silica having a specific surface area of 220 m$^2$/g, a $\tau$700 of 0.130, a bulk density of 40 g/L, and a particle density of 2.203 g/cm$^3$ was used as the raw material particles; and 650 ml of ammonia water having a concentration of 10 mass % was added as a basic aqueous solution to the raw material particles. After that, the silica after drying treatment was milled with the jet mill so that the particle diameter $^C$D50 became 3.0 μm. Thus, silica powder of Example 10 was obtained.

Example 11

Silica powder of Example 11 was obtained by performing the same process as in Example 1 except that, in Example 1, the temperature during the nitrogen replacement of the inside of the mixer and after the nitrogen replacement was kept at room temperature (20° C.)

Comparative Example 1

Silica powder of Comparative Example 1 was obtained by performing the same process as in Example 1 except that the concentration of the ammonia water used as a basic aqueous solution was changed to 2 mass %; and the amount of the ammonia water added to the raw material particles was changed to 400 ml.

Comparative Example 2

The basic aqueous solution-adding step and the drying step were performed in the same manner as in Example 1 except that: a fumed silica having a specific surface area of 300 m$^2$/g, a $\tau$700 of 0.084, a bulk density of 25 g/L, and a particle density of 2.209 g/cm$^3$ was used as the raw material particles; and 1,000 ml of ammonia water having a concentration of 0.15 mass % was added as a basic aqueous solution to the raw material particles. After that, the silica after drying treatment was milled with the jet mill so that the particle diameter $^C$D50 became 2.2 μm. Thus, silica powder of Comparative Example 2 was obtained.

Comparative Example 3

Silica powder of Comparative Example 3 was obtained by performing the same process as in Example 1 except that a fumed silica having a specific surface area of 200 m$^2$/g, a $\tau$700 of 0.157, a bulk density of 75 g/L, and a particle density of 2.200 g/cm$^3$ was used as the raw material particles.

Comparative Example 4

The basic aqueous solution-adding step and the drying step were performed in the same manner as in Example 1 except that 1,500 ml of a basic aqueous solution (pH 10.8) obtained by diluting No. 3 sodium silicate specified in JIS K 1408 to a concentration of 1 mass % was added as a basic aqueous solution to the raw material particles. After that, the silica after drying treatment was milled with the jet mill so that the particle diameter $^C$D50 became 2.3 μm. Thus, silica powder of Comparative Example 4 was obtained.

Comparative Example 5

A commercially available wet process silica milled product (manufactured by Tokuyama Corporation, FINESIL E-50 having a specific surface area of 200 m²/g) was used as it was as silica powder of Comparative Example 5.

Comparative Example 6

A commercially available gel process silica (manufactured by Beijing Aerospace Saide, Gel Process Silica SD-450) was used as it was as silica powder of Comparative Example 6.

Comparative Example 7

A fumed silica having a specific surface area of 297 m²/g, a τ700 of 0.084, a bulk density of 27 g/L, and a particle density of 2.208 g/cm³ was used as raw material particles. 5 Kg of the raw material particles were loaded into a Henschel mixer having an internal volume of 300 L, and were stirred and mixed, followed by the introduction of a nitrogen gas into the mixer to replace the ambient gas in the mixer with the nitrogen gas. Subsequently, under a state in which the temperature in the mixer was kept at normal temperature (25° C.), 750 ml of ammonia water (pH=10.2) having a concentration of 10 ppm was supplied into the mixer at a flow rate of 500 ml/hr through use of a single-fluid nozzle to provide a wetted mixture of the raw material particles wetted with ammonia water.

Subsequently, while the stirring of the wetted mixture was continued and nitrogen was supplied into the mixer at 40 L/hr, the temperature was increased to 180° C. at 100° C./hr. Then, the inside of the mixer was kept at 180° C. for 1 hour to provide silica powder of Comparative Example 7 subjected to drying treatment.

Comparative Example 8

Silica powder of Comparative Example 8 was obtained by milling the silica powder of Comparative Example 7 with the jet mill so that the particle diameter ᶜD50 became 2.6 μm.

Comparative Example 9

Silica powder of Comparative Example 9 was obtained by milling the silica powder of Comparative Example 7 with the jet mill so that the particle diameter ᶜD50 became 1.1 μm.

Comparative Example 10

A wetted mixture of raw material particles wetted with ammonia water was obtained by performing the basic aqueous solution-adding step in the same manner as in Comparative Example 7. Subsequently, the wetted mixture was milled using Single Track Jet Mill (manufactured by Seishin Enterprise Co., Ltd., model: FS4). After that, the resultant milled product was placed in a stationary shelf dryer and dried at a temperature of 120° C. until the water content in the milled product became 3%. Thus, silica powder of Comparative Example 10 was obtained.

Comparative Example 11

A wetted mixture of raw material particles wetted with ammonia water was obtained by performing the basic aqueous solution-adding step in the same manner as in Comparative Example 7. Subsequently, the wetted mixture was milled using a pinned disc mill Jiyu Mill (manufactured by Nara Machinery Co., Ltd., model: M-3). After that, the resultant milled product was placed in a 1 L metal wide-mouthed bottle and dried at a temperature of 55° C. for 20 minutes, and then placed in a stationary shelf dryer and dried at a temperature of 120° C. until the water content in the milled product became 3%. Thus, silica powder of Comparative Example 11 was obtained.

Comparative Example 12

Silica powder of Comparative Example 12 was obtained by milling the silica powder of Comparative Example 11 again using a pinned disc mill Jiyu Mill (manufactured by Nara Machinery Co., Ltd., model: M-3).

Comparative Example 13

A fumed silica having a specific surface area of 297 m²/g, a τ700 of 0.084, a bulk density of 54 g/L, and a particle density of 2.208 g/cm³ was used as raw material particles. 5 Kg of the raw material particles were loaded into a Henschel mixer having an internal volume of 300 L, and were stirred and mixed, followed by the introduction of a nitrogen gas into the mixer to replace the ambient gas in the mixer with the nitrogen gas. Subsequently, under a state in which the temperature in the mixer was heated to 70° C., 3,000 ml of an aqueous sodium silicate solution (pH 10.8) obtained by diluting No. 3 sodium silicate specified in JIS K 1408 to a concentration of 1 mass % was supplied into the mixer to provide a wetted mixture of the raw material particles wetted with the aqueous sodium silicate solution.

Subsequently, the wetted mixture was milled using Single Track Jet Mill (manufactured by Seishin Enterprise Co., Ltd., model: FS4). Then, the resultant milled product was placed in a stationary shelf dryer and dried at a temperature of 127° C. until the water content in the milled product became 4.2%. Thus, silica powder of Comparative Example 13 was obtained.

Comparative Example 14

A fumed silica having the same specific surface area, particle density, and τ700 as the fumed silica used in Example 1 but having a bulk density of 25 g/L was used as the raw material particles, and the basic aqueous solution-adding step and the drying step were performed in the same manner as in Example 1 except that the raw material particles used were different. After that, the silica after drying treatment was milled with the jet mill so that the particle diameter ᶜD50 became 1.1 μm. Thus, silica powder of Comparative Example 14 was obtained.

Comparative Example 15

A fumed silica having the same specific surface area, particle density, and τ700 as the fumed silica used in Example 1 but having a bulk density of 120 g/L was used as the raw material particles, and silica powder of Comparative Example 15 was obtained by performing the same process as in Example 1 except that the raw material particles used were different.

Comparative Example 16

Silica powder subjected to drying treatment was obtained by performing the basic aqueous solution-adding step and the drying step in the same manner as in Example 1 except that the amount of the ammonia water added to the raw material particles was changed to 780 ml. Next, the silica after drying treatment was milled with the jet mill and adjusted so that the particle diameter ᶜD50 became 1.4 μm. Thus, silica powder of Comparative Example 16 was obtained.

Comparative Example 17

Silica powder subjected to drying treatment was obtained by performing the basic aqueous solution-adding step and the drying step in the same manner as in Example 1 except that the amount of the ammonia water added to the raw material particles was changed to 165 ml. Next, the silica after drying treatment was milled with the jet mill and adjusted so that the particle diameter $^CD50$ became 1.4 μm. Thus, silica powder of Comparative Example 17 was obtained.

The production conditions for the silica powders of Examples and Comparative Examples are shown in Table 1 and Table 2. In addition, the physical property values of paints prepared using the silica powders of Examples and Comparative Examples, and the evaluation results of coating films formed using the paints are shown in Table 3 and Table 4.

TABLE 1

| | Basic aqueous solution-adding step | | | | | | | | | | | | |
|---|---|---|---|---|---|---|---|---|---|---|---|---|
| | Raw material particles (fumed silica) | | | | | | | | | | Addition amount of basic aqueous solution with respect to 100 parts by mass of raw material particles | Drying step Heating temperature |
| | Specific surface area | Bulk density | Particle density | Usage amount | Basic sub-stance (*2) | Basic aqueous solution (*1) | | | | | | |
| | | | | | | Concentration | | | Usage amount | | | |
| | | | | | | mass % or ppm | (N) | pH | (ml) | (g) | | |
| | (m²/g) | τ700 | (g/L) | cm³ | (Kg) | | | | | | | (parts by mass) | (° C.) |
| Example 1 | 300 | 0.084 | 75 | 2.209 | 5 | Ammonia | 25 mass % | 13.4 | 14.0 | 250 | 225 | 4.5 | 180 |
| Example 2 | 300 | 0.084 | 75 | 2.209 | 5 | | 25 mass % | 13.4 | 14.0 | 250 | 225 | 4.5 | |
| Example 3 | 300 | 0.084 | 61 | 2.209 | 5 | | 18 mass % | 9.8 | 13.5 | 340 | 316.2 | 6.3 | |
| Example 4 | 250 | 0.114 | 85 | 2.205 | 5 | | 25 mass % | 13.4 | 14.0 | 223 | 200.7 | 4.0 | |
| Example 5 | 300 | 0.084 | 75 | 2.209 | 5 | | 9.8 mass % | 5.5 | 12.9 | 600 | 573 | 11.5 | |
| Example 6 | 300 | 0.084 | 100 | 2.209 | 5 | | 25 mass % | 13.4 | 14.0 | 250 | 225 | 4.5 | |
| Example 7 | 380 | 0.067 | 55 | 2.210 | 5 | | 25 mass % | 13.4 | 14.0 | 250 | 225 | 4.5 | |
| Example 8 | 300 | 0.084 | 75 | 2.209 | 5 | | 25 mass % | 13.4 | 14.0 | 250 | 225 | 4.5 | |
| Example 9 | 225 | 0.128 | 110 | 2.203 | 5 | | 14 mass % | 7.7 | 13.2 | 500 | 470.5 | 9.4 | |
| Example 10 | 220 | 0.130 | 40 | 2.203 | 5 | | 10 mass % | 5.6 | 12.9 | 650 | 621.4 | 12.4 | |
| Example 11 | 300 | 0.084 | 75 | 2.209 | 5 | | 25 mass % | 13.4 | 14.0 | 250 | 225 | 4.5 | |
| Comparative Example 1 | 300 | 0.084 | 75 | 2.209 | 5 | Ammonia | 2 mass % | 1.2 | 12.0 | 400 | 399.2 | 8.0 | 180 |
| Comparative Example 2 | 300 | 0.084 | 25 | 2.209 | 5 | | 0.15 mass % | 0.09 | 11.4 | 1,000 | 1,000 | 20 | |
| Comparative Example 3 | 200 | 0.157 | 75 | 2.200 | 5 | | 25 mass % | 13.4 | 14.0 | 250 | 225 | 4.5 | |
| Comparative Example 4 | 300 | 0.084 | 75 | 2.209 | 5 | Sodium silicate | 1 mass % | 0.02 | 10.8 | 1,500 | >1,500 | >30 | |
| Comparative Example 5 | | | | | | | Wet process silica milled product | | | | | | |
| Comparative Example 6 | | | | | | | Gel process silica | | | | | | |

(*1) The specific gravity of 25 mass % ammonia water is 0.9.
(*2) The boiling point of ammonia is about −33° C., and the melting point of sodium silicate is 1,088° C. (and hence its boiling point has a value of more than 1,088° C.).

TABLE 2

| | Basic aqueous solution-adding step | | | | | | | | | | | | |
|---|---|---|---|---|---|---|---|---|---|---|---|---|
| | Raw material particles (fumed silica) | | | | | | | | | | Addition amount of basic aqueous solution with respect to 100 parts by mass of raw material particles | Drying step Heating temperature |
| | Specific surface area | Bulk density | Particle density | Usage amount | Basic sub-stance (*2) | Basic aqueous solution (*1) | | | | | | |
| | | | | | | Concentration | | | Usage amount | | | |
| | | | | | | mass % or ppm | (N) | pH | (ml) | (g) | | |
| | (m²/g) | τ700 | (g/L) | cm³ | (Kg) | | | | | | | (parts by mass) | (° C.) |
| Comparative Example 7 | 297 | 0.084 | 27 | 2.208 | 5 | Ammonia | 10 ppm | 0.001 | 10.2 | 750 | 750 | 15.0 | 180 |
| Comparative Example 8 | | | | | | | | 0.001 | | | | | 180 |
| Comparative Example 9 | | | | | | | | 0.001 | | | | | 180 |
| Comparative Example 10 | | | | | | | | 0.001 | | | | | 120 |

TABLE 2-continued

| | Raw material particles (fumed silica) | | | | | Basic aqueous solution (*1) | | | | | | Addition amount of basic aqueous solution with respect to 100 parts by mass of raw material particles (parts by mass) | Drying step Heating temperature (° C.) |
|---|---|---|---|---|---|---|---|---|---|---|---|---|---|
| | Specific surface area (m²/g) | τ700 | Bulk density (g/L) | Particle density (g/cm³) | Usage amount (Kg) | Basic substance (*2) | Concentration mass % or ppm | (N) | pH | Usage amount (ml) | (g) | | |
| Comparative Example 11 | | | | | | | | 0.001 | | | | | 120 |
| Comparative Example 12 | | | | | | | | 0.001 | | | | | 120 |
| Comparative Example 13 | 297 | 0.084 | 54 | 2.208 | 5 | Sodium silicate | 1 mass % | 0.02 | 10.8 | 3,000 | >3,000 | >200 | 127 |
| Comparative Example 14 | 300 | 0.084 | 25 | 2.209 | 5 | Ammonia | 25 mass % | 13.4 | 14.0 | 250 | 225 | 4.5 | 180 |
| Comparative Example 15 | 300 | 0.084 | 120 | 2.209 | 5 | | 25 mass % | 13.4 | 14.0 | 250 | 225 | 4.5 | 180 |
| Comparative Example 16 | 300 | 0.084 | 75 | 2.209 | 5 | | 25 mass % | 13.4 | 14.0 | 780 | 702 | 14.0 | 180 |
| Comparative Example 17 | 300 | 0.084 | 75 | 2.209 | 5 | | 25 mass % | 13.4 | 14.0 | 165 | 148.5 | 3.0 | 180 |

(*1) The specific gravity of 25 mass % ammonia water is 0.9.
(*2) The boiling point of ammonia is about −33° C., and the melting point of sodium silicate is 1,088° C. (and hence its boiling point has a value of more than 1,088° C.).

TABLE 3

| | Physical property values of silica | | | | | | | | | Physical property values of paint | | | Evaluation results of coating film | | |
|---|---|---|---|---|---|---|---|---|---|---|---|---|---|---|---|
| | $^L$D50 (μm) | $^C$D50 (μm) | $^L$D50/$^C$D50 | τ700 | Particle density (g/cm³) | Specific surface area (m²/g) | pH | Bulk density (g/L) | DBP oil absorption (ml/100 g) | Fineness gauge value (μm) | Viscosity (mPa·s) | TI | L* value | Gloss value (%) | Visual evaluation |
| Example 1 | 6.8 | 1.4 | 4.9 | 0.42 | 2.187 | 251 | 8.0 | 50 | 340 | 40 | 508 | 5.4 | 19.0 | 0.4 | A |
| Example 2 | 11.6 | 2.6 | 4.5 | 0.44 | 2.187 | 252 | 8.1 | 52 | 335 | 45 | 360 | 5.1 | 19.3 | 0.7 | B |
| Example 3 | 6.8 | 1.4 | 4.9 | 0.50 | 2.190 | 240 | 6.2 | 45 | 310 | 35 | 390 | 5.4 | 19.5 | 0.6 | A |
| Example 4 | 6.7 | 1.4 | 4.8 | 0.48 | 2.189 | 200 | 6.9 | 58 | 310 | 40 | 550 | 5.5 | 19.9 | 0.5 | B |
| Example 5 | 5.8 | 1.3 | 4.5 | 0.58 | 2.198 | 210 | 7.4 | 57 | 330 | 45 | 280 | 4.8 | 19.8 | 0.5 | B |
| Example 6 | 5.5 | 1.1 | 5.0 | 0.46 | 2.183 | 225 | 8.9 | 57 | 315 | 35 | 480 | 5.5 | 19.4 | 0.8 | B |
| Example 7 | 6.1 | 1.2 | 5.1 | 0.35 | 2.195 | 325 | 7.0 | 43 | 330 | 50 | 450 | 5.6 | 18.9 | 0.5 | A |
| Example 8 | 15.0 | 3.5 | 4.3 | 0.39 | 2.187 | 250 | 8.2 | 54 | 320 | 50 | 300 | 4.7 | 20.0 | 0.9 | B |
| Example 9 | 14.2 | 3.3 | 4.3 | 0.60 | 2.182 | 194 | 6.1 | 60 | 290 | 35 | 510 | 5.8 | 20.5 | 0.8 | B |
| Example 10 | 13.2 | 3.0 | 4.4 | 0.59 | 2.191 | 198 | 5.9 | 35 | 280 | 35 | 600 | 5.9 | 20.7 | 0.9 | B |
| Example 11 | 6.7 | 1.4 | 4.8 | 0.44 | 2.188 | 245 | 8.1 | 52 | 320 | 40 | 480 | 5.3 | 19.1 | 0.4 | A |
| Comparative Example 1 | 6.1 | 1.4 | 4.4 | 0.68 | 2.189 | 274 | 6.8 | 52 | 310 | 60 | 280 | 4.8 | 21.0 | 1.0 | C |
| Comparative Example 2 | 9.0 | 2.2 | 4.1 | 1.20 | 2.194 | 254 | 6.6 | 46 | 360 | 70 | 226 | 4.2 | 22.4 | 1.0 | C |
| Comparative Example 3 | 6.1 | 1.4 | 4.4 | 0.62 | 2.180 | 170 | 8.0 | 50 | 280 | 60 | 600 | 5.6 | 23.5 | 1.0 | C |
| Comparative Example 4 | 9.0 | 2.3 | 3.9 | 0.78 | 2.195 | 270 | 6.3 | 50 | 260 | 60 | 350 | 3.8 | 23.0 | 1.8 | D |
| Comparative Example 5 | 7.2 | 1.8 | 4.0 | 2.03 | 2.130 | 200 | 6.6 | 70 | 250 | 50 | 250 | 3.5 | 22.1 | 2.0 | D |
| Comparative Example 6 | 4.0 | 1.5 | 2.7 | 1.45 | 2.090 | 290 | 4.3 | 59 | 350 | 30 | 200 | 3.0 | 21.5 | 1.5 | D |

TABLE 4

| | Physical property values of silica | | | | | | | | | Physical property values of paint | | | Evaluation results | | |
| | | | | | | | | | | Fineness | | | of coating film | | |
| | $^{L}$D50 (µm) | $^{C}$D50 (µm) | $^{L}$D50/ $^{C}$D50 | τ700 | Particle density (g/cm³) | Specific surface area (m²/g) | pH | Bulk density (g/L) | DBP oil absorption (ml/100 g) | gauge value (µm) | Viscosity (mPa · s) | TI | L* value | Gloss value (%) | Visual evaluation |
|---|---|---|---|---|---|---|---|---|---|---|---|---|---|---|---|
| Comparative Example 7 | 18.8 | 4.8 | 3.9 | 0.92 | 2.192 | 289 | 4.5 | 34 | 325 | >100 | 460 | 4.1 | 23.2 | 2.3 | D |
| Comparative Example 8 | 10.5 | 2.6 | 4.0 | 0.88 | 2.192 | 287 | 4.5 | 31 | 340 | 45 | 480 | 4.6 | 22.1 | 1.9 | D |
| Comparative Example 9 | 4.5 | 1.1 | 4.1 | 0.72 | 2.191 | 287 | 4.4 | 27 | 350 | 40 | 550 | 4.8 | 21.3 | 1.5 | D |
| Comparative Example 10 | 8.0 | 2.2 | 3.6 | 0.80 | 2.190 | 290 | 4.6 | 29 | 300 | 50 | 480 | 4.2 | 21.2 | 1.3 | D |
| Comparative Example 11 | 16.5 | 4.1 | 4.0 | 0.91 | 2.189 | 289 | 4.5 | 30 | 310 | 65 | 500 | 4.3 | 21.8 | 1.4 | D |
| Comparative Example 12 | 13.0 | 3.4 | 3.8 | 0.89 | 2.190 | 288 | 4.5 | 28 | 320 | 50 | 520 | 4.4 | 21.6 | 1.3 | D |
| Comparative Example 13 | 9.7 | 3.3 | 2.9 | 1.23 | 2.196 | 245 | 6.5 | 65 | 250 | >100 | 350 | 3.3 | 23.5 | 2.4 | D |
| Comparative Example 14 | 5.9 | 1.1 | 5.4 | 0.34 | 2.189 | 278 | 8.1 | 28 | 300 | 35 | 700 | 5.6 | 21.2 | 1.3 | C |
| Comparative Example 15 | 5.6 | 1.4 | 4.0 | 0.50 | 2.185 | 240 | 8.2 | 68 | 260 | 90 | 350 | 4.2 | 22.3 | 2.0 | D |
| Comparative Example 16 | 6.1 | 1.4 | 4.4 | 0.60 | 2.170 | 200 | 8.2 | 53 | 270 | 100 | 500 | 5.3 | 23.7 | 1.2 | D |
| Comparative Example 17 | 5.6 | 1.4 | 4.0 | 0.38 | 2.191 | 277 | 7.6 | 54 | 290 | 40 | 690 | 5.8 | 21.8 | 1.7 | C |

<Evaluation of Dispersibility in Resin Composition for Paint>

For each of the silica powders of Example 6 and Example 10, and the silica powder of Comparative Example 14, dispersibility in a resin composition to be used for the preparation of a paint (resin composition containing an aliphatic urethane resin as a main component) was evaluated by the following procedure.

First, 3.75 g of the silica powder was added to the top of 100 g of a resin composition (manufactured by Deep Blue Technology Co., Ltd., BLLK-2000 (aliphatic urethane paint; solid content: 15%, content of solvent formed of toluene/isopropyl alcohol (IPA)=9/1 (mass ratio): 85%) filled into a container. Next, the mixture was stirred with a stirring machine including a disper blade having an outer diameter of 40 mm at 2,500 rpm (peripheral speed: 5.2 m/S). At this time, the stirring was continued until the silica powder finished being evenly and uniformly dispersed in the resin composition. Whether or not the silica powder finished being evenly and uniformly dispersed in the resin composition was determined through visual observation. In addition, a time period from the start of the stirring to the end of the stirring was measured. As a result, it was recognized that the period of time until the silica powder finished being evenly and uniformly dispersed in the resin composition was 4 minutes for the silica powder of Example 6 and 5.3 minutes for the silica powder of Example 10, but was 8 minutes for the silica powder of Comparative Example 14.

The invention claimed is:

1. A silica, which
has an aggregated structure in which primary particles are aggregated,
has a particle diameter ratio R represented by the following equation (1);

$$R = {}^{L}D50/{}^{C}D50.$$  equation (1)

has an absorbance of 0.6 or less for light having a wavelength of 700 nm as an aqueous dispersion having a concentration of 1.48 mass %, and has a particle density measured with a He pycnometer of 2.18 g/cm³ or more, wherein the particle diameter ratio R as calculated using equation (1) is from 4.3 to 5.2, and in the equation (1), $^{L}$D50 represents a volume-based 50% cumulative particle diameter (µm) of the silica measured based on a laser diffraction/scattering method, and $^{C}$D50 represents a volume-based 50% cumulative particle diameter (µm) of the silica measured based on a Coulter counter method.

2. The silica according to claim 1, wherein the volume-based 50% cumulative particle diameter $^{L}$D50 is 1.7 µm or more.

3. The silica according to claim 1, wherein the silica has a bulk density of 35 g/L or more.

4. A matting agent for a paint comprising the silica according to claim 1.

5. A clear paint or a black-colored paint comprising the matting agent according to claim 4.

6. A paint, comprising at least:
a matting agent; and
a resin,
wherein the matting agent contains a silica, which has a structure in which primary particles are aggregated, has a particle diameter ratio R represented by the following equation (1) of from 4.3 to 5.2, has an absorbance of 0.6 or less for light having a wavelength of 700 nm as an aqueous dispersion having a concentration of 1.48 mass %, and has a particle density measured with a He pycnometer of 2.18 g/cm³ or more:

$$R = {}^{L}D50/{}^{C}D50$$  Equation (1)

in the equation (1), $^{L}$D50 represents a volume-based 50% cumulative particle diameter (µm) of the silica measured based on a laser diffraction/scattering method, and $^{C}$D50 represents a volume-based 50% cumulative particle diameter (μm) of the silica measured based on a Coulter counter method.

7. The paint according to claim 6, wherein the paint is any one selected from the group consisting of: a clear paint; and a black-colored paint.

* * * * *